United States Patent [19]
Geibel et al.

[11] Patent Number: 5,437,788
[45] Date of Patent: Aug. 1, 1995

[54] BACKWASHING FILTER ASSEMBLY

[75] Inventors: Stephen A. Geibel; Ashok K. Bhanot, both of Cortland, N.Y.

[73] Assignee: Pall Corporation, East Hills, N.Y.

[21] Appl. No.: 179,121

[22] Filed: Jan. 10, 1994

[51] Int. Cl.$^6$ ............................................. B01D 29/66
[52] U.S. Cl. ............................ 210/333.01; 210/323.2; 210/411
[58] Field of Search ................ 210/777, 778, 798, 108, 210/333.01, 333.1, 411, 412, 323.2

[56] References Cited

U.S. PATENT DOCUMENTS

| | | | |
|---|---|---|---|
| 2,784,846 | 3/1957 | Olson et al. | 210/333.01 |
| 3,666,097 | 5/1972 | Ryan | 210/798 |
| 4,123,356 | 10/1978 | Sugimoto et al. | 210/333.01 |
| 4,707,257 | 11/1987 | Davis et al. | 210/274 |
| 4,781,825 | 11/1988 | Grimes et al. | 210/107 |
| 5,017,241 | 5/1991 | Ryan | 134/34 |
| 5,114,596 | 5/1992 | Laterra | 210/798 |

OTHER PUBLICATIONS

"Pall Porous Metal Backwash Filter Systems for Liquid Streams".

Primary Examiner—Peter A. Hruskoci
Attorney, Agent, or Firm—Leydig, Voit & Mayer

[57] ABSTRACT

A filter assembly includes a housing divided into a first chamber and a second chamber. A filter element is disposed in the first chamber, and a conduit is disposed in and opens to the second chamber. A weep hole introduces a backwash liquid from the second chamber into the filter element or the conduit. A differential pressure is then established between the opening in the conduit and the exterior of the filter element to force the backwash liquid through the filter element and thereby clean the filter element and/or strip a precoat layer from the filter element.

25 Claims, 3 Drawing Sheets

BACKWASHING FILTER ASSEMBLY

TECHNICAL FIELD

This invention relates to a filter assembly and a method for cleaning the filter assembly by backwashing. In particular, it relates to an assembly and method suitable for cleaning a filter element, including a precoat filter element.

BACKGROUND OF THE INVENTION

A filter assembly typically includes at least one filter element which removes one or more undesirable substances from a fluid such as a liquid. For example, the filter element may be used to remove particulate or colloidal matter from the fluid. It may also be used to remove certain chemicals, minerals, or ions from the fluid. Consequently, filtration or filtering, as used in this application, includes the removal of particulate or colloidal matter from a fluid, for example, by sieving or trapping the matter, and/or the purification of a fluid, for example, by ion exchange, demineralization, or sorption.

During use, the filter element may become clogged or fouled by the particulate or colloidal matter in the fluid being filtered. This increases the pressure drop across the filter element and reduces its utility. Therefore, it is desirable to be able to clean the filter element to remove the accumulated matter.

There are also filter elements which it may be desirable to clean even when they have not become fouled. An example of such a filter element is a so-called precoat filter element, which has a layer of particles, such as ion exchange resin particles, coated on the upstream surface of the filter element prior to use. This layer, referred to as a precoat layer, is able to filter various substances from the fluid being filtered. However, over time, the precoat layer becomes fouled or depleted of its capacity and its ability to remove substances is reduced. At this point, it is desirable to clean the filter element so as to remove the old precoat layer and then replace it with a new precoat layer.

One method of cleaning a filter element is known as backwashing. In this method, a cleaning liquid (such as water), referred to as a backwash liquid, is forced at a high rate of flow, pressure, and/or volume through the filter element in the opposite direction from the direction of fluid flow during normal filtering operations. Typically, the flow of backwash liquid through the filter element is produced by gas under pressure acting on the backwash liquid. However, conventional backwashing arrangements for filter elements tend to be complicated and may require a large quantity of backwash liquid.

SUMMARY OF THE INVENTION

Accordingly, it is an object of the present invention to provide a filter assembly including a backwashing arrangement which has a simple structure and can operate effectively, economically, and efficiently.

It is still another object of the present invention to provide a method for cleaning a filter assembly which reduces the amount of backwashing liquid passed through the filter element and, therefore, reduces the liquid waste generated when the filter assembly is backwashed.

Accordingly, the present invention provides a filter assembly comprising a housing, at least one filter element, and at least one conduit. The housing is divided into a first chamber and a second chamber which can contain the backwashing liquid. The filter element is disposed in the first chamber, and the conduit is disposed in the second chamber. The interior of the conduit communicates with the interior of the filter element, and the conduit has an opening which communicates with the second chamber. The filter assembly further comprises at least one weep hole which is below the opening in the conduit. The weep hole is arranged to drain backwash liquid from the second chamber into the interior of the filter element and/or the interior of the conduit.

The present invention also provides a method for cleaning a filter element comprising draining a backwash liquid through a weep hole into the interior of a filter element or the interior of a conduit coupled to the filter element. The method further comprises establishing a differential pressure between an opening in the conduit above the weep hole and the exterior of the filter element. This forces the backwash liquid from the interior of the conduit or the interior of the filter element through the filter element and cleans the filter element and/or strips a precoat layer from the filter element.

In a preferred embodiment, the weep hole is located in the conduit, forming an elegantly simple structure. Further, the backwash liquid blown through the filter elements may be limited to the amount of liquid which fills the interior of each filter element or conduit. Consequently, the amount of backwash liquid used to clean the filter element may be significantly reduced. Reducing the amount of backwash liquid is particularly important in the radioactive waste industry where proper disposal of the backwash liquid is very difficult and expensive.

DESCRIPTION OF EMBODIMENTS

Figure 1:
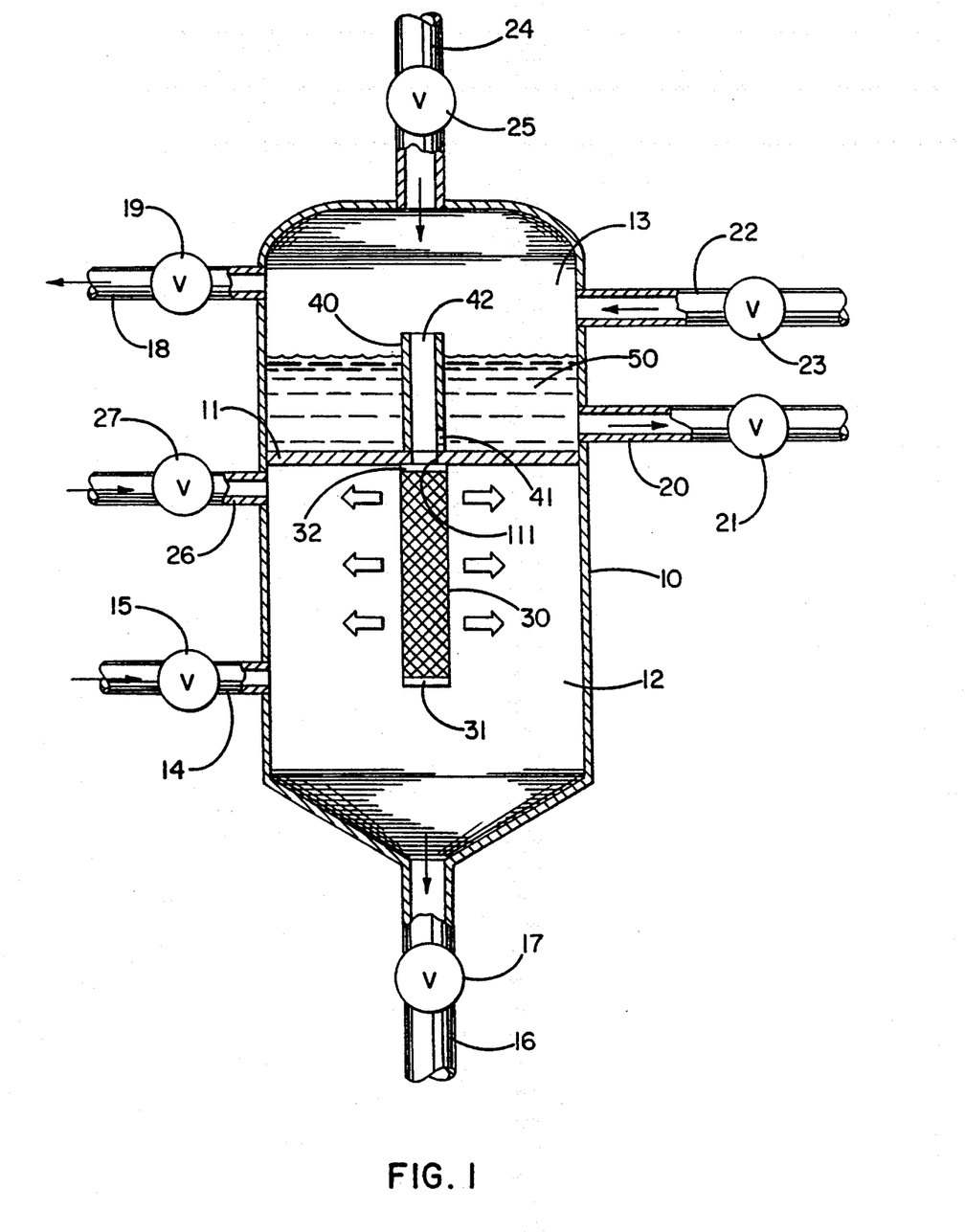
FIG. 1 is a cross-sectional elevation view of a first embodiment of a filter assembly according to the present invention in which a filter element is disposed below a partition.

As shown in FIG. 1, a first exemplary filter assembly embodying the present invention includes a housing 10 which is divided by a partition 11, such as a tube sheet, into first and second chambers 12 and 13. One or more filter elements 30 (only one of which is shown) are disposed inside the first chamber 12 and attached to the partition 11. The partition 11 is preferably impervious to the liquid being filtered as well as to gas and is sealingly connected to the inner wall of the housing 10. This embodiment can be used both for filtering a fluid by means of the filter element 30 and for cleaning the filter element 30 by backwashing. During normal filtering operation, a fluid to be filtered flows from the first chamber 12 into the second chamber 13 through the filter element 30, and during backwashing operation, a backwashing fluid flows from the second chamber 13 to the first chamber 12 through the filter element 30.

The housing 10 is preferably constructed so that the filter elements 30 can be readily accessed to permit their replacement. For example, the housing 10 can include upper and lower halves detachably connected to one another. Alternatively, a sealable access port can be formed in the wall of the housing 10 to permit access to the inside of the first chamber 12.

The housing 10 need not have any particular shape or size. Generally the shape of the housing 10 will be selected based on strength considerations so that the housing 10 will have sufficient strength to withstand the pressures exerted on it during filtration or backwashing. For simplicity of structure and operation, the partition 11 is typically disposed in the housing 10 substantially horizontally. In the first embodiment, the first chamber 12 is disposed below the second chamber 13.

A plurality of pipes may be connected to the housing 10 for introducing fluids into and removing fluids from the housing 10. In the present embodiment, a fluid feed pipe 14 and a lower drain pipe 16 are connected to the housing 10 so as to communicate with the inside of the first chamber 12. The fluid feed pipe 14 is used to introduce a fluid to be filtered into the first chamber 12 from an unillustrated source, and the lower drain pipe 16 is used to remove unwanted materials from the first chamber 12 and drain the first chamber 12. A make-up gas feed 26 may communicate with the first chamber 12 preferably just below the partition 11. The make-up gas feed pipe 26 supplies a make-up gas, such as air, to facilitate draining the first chamber 12 through the lower drain pipe 16. It may also serve to vent the first chamber 12. The fluid feed pipe 14, the lower drain pipe 16, and the gas feed pipe 26 are equipped with corresponding control valves 15, 17, and 27 for controlling flow through these pipes.

A filtrate discharge pipe 18, an upper drain pipe 20, a backwash liquid feed pipe 22, and a pressurized gas feed pipe 24 are connected to the housing 10 so as to communicate with the inside of the second chamber 13. The filtrate discharge pipe 18 is used to remove filtrate, i.e., fluid which has passed through the filter elements 30 from the first chamber 12 into the second chamber 13. The upper drain pipe 20 is used for removing unwanted materials from the second chamber 13. The backwash liquid feed pipe 22 supplies a suitable backwash liquid to the second chamber 13 from an unillustrated source, and the pressurized gas feed pipe 24 supplies the second chamber 13 with a compressed gas from an unillustrated source.

Each of the pipes 18, 20, 22, and 24 may be equipped with a corresponding control valve 19, 21, 23, and 25. The control valves 15, 17, 19, 21, 23, and 25 for the various pipes can be controlled manually, or they can be automatically controlled, e.g., made to operate according to a prescribed sequence by an unillustrated programmable control unit.

In the illustrated embodiment, each pipe serves a single function, but it is possible to have a single pipe serve a plurality of functions. For example, one pipe could be used both as a filtrate discharge pipe and as a drain pipe or one pipe could be used both as a filtrate discharge pipe and as a backwash liquid feed pipe. It is also possible to use filtrate accumulated in the second chamber 13 as a backwash liquid, in which case the backwash liquid feed pipe 22 can be eliminated. In addition, it is possible to have more pipes than in the illustrated embodiment. A pressurized gas feed pipe may be coupled to the first chamber 12 to supply a compressed gas to the chamber 12, or a make-up gas feed pipe may be coupled to the second chamber 13 to supply make-up gas as the filtrate is drained. Furthermore, the figures are merely a schematic representation, and the locations of the pipes on the housing 10 are not limited to those shown in the figures.

For each of the filter elements 30, an opening 111 which communicates between the first and second chambers 12 and 13 is formed in the partition 11. Each filter element 30 is connected at one end to the partition 11 so that fluid from the first chamber 12 can enter the opening 111 only by first passing through the filter element 30. Preferably, the filter elements 30 are detachably mounted on the partition 11 so that they can be easily replaced. The size of the opening 111 can be selected based on fluid flow requirements during filtration. In this embodiment, each filter element 30 is disposed entirely within the first chamber 12, although it is possible for the filter elements 30 to extend partway into the second chamber 13. Each filter element may also be connected at the other end to a support plate (not shown) which extends across the housing parallel to the partition.

The filter element 30 is not limited to a particular type. The filter element 30 typically includes a porous medium or septum formed in a hollow, preferably cylindrical, configuration and capped by a blind end cap 31 and an open end cap 32. The porous medium may comprise a pleated or unpleated filter medium, such as a mesh, a woven or nonwoven fibrous medium, a porous membrane, or a porous metal medium. If the porous medium serves to support a precoat layer, the porous medium may be relatively coarse, and the precoat layer may serve as the primary filter. To support against inwardly directed forces, the filter element 30 may include a perforated core around which the porous medium is formed. To support against outwardly directed forces, in particular, those generated during backwashing, the filter element 30 may include a perforated cage or a wrap wound around the porous medium.

In the first embodiment, a hollow conduit 40 extends upwards from the partition 11 into the second chamber 13 and surrounds the opening 111 in the partition 11. If there are a plurality of filter elements 30, the opening 111 corresponding to each filter element 30 may be equipped with a similar conduit 40. Alternatively, a single conduit may be arranged to communicate with a plurality of filter elements or a plurality of conduits may be arranged to communicate with a single filter element. In accordance with one aspect of the invention, one or more weep holes 41 communicate between the second chamber 13 and the interior of the conduit 40 or the filter element 30. For example, in the first embodiment, the weep holes 41 (only one of which is shown) are formed through the wall of the conduit 40 to permit backwash liquid to pass through the wall of the conduit 40 and into the hollow filter element 30. The conduit 40 also has an opening above the level of the weep hole 41 to permit compressed gas to enter into the conduit 40 during backwashing and to permit filtrate to be discharged into the second chamber 13 during filtration.

The conduit may be variously configured. In the illustrated embodiment, the conduit 40 is in the form of a cylindrical pipe having first and second open ends. The first or lower end is sealingly connected to the partition 11 surrounding the hole 111 and has a first opening communicating with the hole 111, while the second or upper end has a second opening 42 which opens onto the inside of the second chamber 13. During backwashing, the conduit 40 serves as a dam to enable backwash liquid 50 to accumulate in the bottom of the second chamber 13 as well as a conduit for compressed gas. The size and cross-sectional shape of the conduit 40 are not critical and can be chosen based on fluid flow considerations. For example, instead of being cylindrical, the conduit 40 may have a polygonal cross-section. In addition, the conduit 40 need not have a constant bore size, and the upper end of the conduit 40 need not be completely open, as shown in FIG. 1. However, the conduit 40 does contain an opening permitting the passage of filtrate during the filtration operation. For example, the upper end of the conduit 40 could be closed off and an opening for filtrate could be formed in the wall of the conduit 40 near its upper end. However, to reduce fluid flow resistance, it is often preferable for the upper end of the conduit 40 to be open, as shown in FIG. 1. The conduit 40 is illustrated as extending perpendicularly from the partition 11, but the angle of the conduit 40 with respect to the partition 11 is not critical. The conduit 40 is also illustrated as being disposed entirely within the second chamber 13, but it is possible for the lower end of the conduit 40 to extend into the first chamber 12. Further, the conduit 40 may be an extension of the filter element 30 which fits through the opening 111 when the filter element 30 is attached to the partition 11.

In the first embodiment, the weep hole 41 is preferably formed in the conduit 40 as close as possible to the partition 11 so as to minimize the amount of backwash liquid 50 remaining in the second chamber 13 at the end of the backwash operation. However, the exact placement of the weep hole 41 may vary. Generally, the weep holes 41 are below the second opening 42 in the conduit 40. The weep hole 41 is illustrated as being spaced from the lower end surface of the conduit 40, but it is also possible for the weep hole 41 to be formed in the lower end surface.

The size and number of weep holes may vary depending on several factors. For example, the weep hole is preferably large enough that the backwash fluid, given its surface tension, will drain through the weep hole and will drain at a sufficient rate to fill the interior of the filter element and the conduit within a reasonable length of time. The weep hole is preferably small enough to limit the eduction rate through the weep hole as the backwash fluid is forced from the interior of the filter element. In the illustrated embodiment, the weep hole 41 comprises a circular hole in the conduit 40, preferably about 3/16" to about ¼" in diameter, and there is only one weep hole 41 in each conduit 40.

The weep hole can be configured in a variety of other ways to permit backwash liquid 50 to enter into the filter element 30 from the second chamber 13. For example, weep holes could be defined by crenelations formed in the lower end surface of the conduit 40. Or the conduit 40 could be installed with a minute gap between the lower end of the conduit and the partition 11, and the gap serving as a weep hole. However, it may be simpler to control the size of a weep hole 41 formed in the conduit 40 than to control the size of a gap between the conduit 40 and the partition 11. Alternatively, the conduit 40 may be mounted directly against the partition 11, and the surface of the partition 11 facing the second chamber 13 may include one or more channels. Each channel may communicate under the conduit 40 between the second chamber 13 and the opening 111 in the partition 11 and serve as a weep hole.

A filter assembly embodying the invention may be operated in a variety of ways. If the filter elements 30 are precoat filter elements, prior to the start of filtration, a precoat layer may be applied to the filter elements 30 by conventional methods. For example, all of the valves except the feed valve 15 and the upper drain valve 21 may be closed. A precoat material in the form of a slurry, such as a slurry of ion exchange resin particles suspended in a deionized water base, can then be introduced into the first chamber 12 through the fluid feed pipe 14 and applied to the outer surface of the filter element 30 to form a precoat layer. Once a sufficient precoat layer has been deposited on the filter element 30, the flow of slurry into the first chamber 12 is discontinued by closing the feed valve 15 and/or the drain valve 21 and the feed fluid to be filtered is introduced into the first chamber 12 and the filtrate discharge valve 19 is opened. The transition between the flow of precoat slurry and the flow of feed fluid is preferably controlled such that flow outside-in through the precoat and the filter element 30 is maintained at all times. This helps retain the precoat layer adjacent to the filter element.

During filtration, all of the valves expect the fluid feed valve 15 and the filtrate discharge valve 19 are typically closed. A fluid to be filtered is introduced into the first chamber 12 through the fluid feed pipe 14 and is passed through the filter element 30 or through the precoat layer and the filter element 30 to become filtrate. The filtrate then passes along the hollow interior of the filter element 30, through the opening 111 in the partition 11, and through the conduit 40 into the second chamber 13 via the opening 42 and the weep hole 41. The filtrate then leaves the second chamber 13 through the filtrate discharge pipe 18 and may be collected in an unillustrated reservoir, for example. Usually, during filtration, the first chamber 12 will be completely filled with the feed fluid, and the second chamber 13 will be completely filled with filtrate.

After the precoat layer is fouled or depleted or after the filter element is fouled, it may be desirable to remove the precoat layer and/or to clean the filter element 30 by backwashing. The fluid feed valve 15 and the filtrate discharge valve 19 are closed to cut off the supply of feed fluid through the fluid feed pipe 14. The lower drain valve 17 may remain closed and the feed fluid may remain in the first chamber 12. Alternatively, in order to minimize the fluid forces which must be overcome during backwashing, the first chamber 12 is preferably drained so that the fluid in the first chamber 12 is at or below the bottom of the filter element 30. For example, the lower drain control valve 17 and the make-up gas feed valve 27 may be opened so the first chamber 12 is completely drained of the feed fluid through the lower drain pipe 16. The drained first chamber 12 may be maintained at atmospheric pressure. Alternatively, if the filter elements 30 are coarse, the drained first chamber 12 may be slightly pressurized to impede the flow of filtrate from the interiors of the filter elements 30 through the filter elements 30 and into the first chamber 12. Preferably, the drained first chamber 12 is pressurized to a value just below the bubble point of the filter media of the filter elements 30. The bubble point of a filter element is typically in the range from about 1 psid to about 80 psid, preferably from about 1 psid to about 20 psid. Thus, for example, if the bubble point of the filter element were 20 psid, the drained filter chamber may be pressurized to a value of at least about 75% of the bubble point or, more preferably, of at least about 90% of the bubble point.

The second chamber 13 preferably remains full of filtrate, which may be used as the backwash liquid, or the second chamber 13 may be drained of filtrate, preferably by means of the upper drain valve 21 and the upper drain pipe 20. The filtrate may be drained to any suitable level which is preferably higher than the weep hole 41, e.g., level with or near the second opening 42 in the upper end of the conduit 40. The filtrate may then be used as the backwash liquid. Alternatively, the filtrate may be completely drained from the second chamber 13 and a backwash liquid 50 may be introduced into the second chamber 13 via the backwash feed pipe 22 and the backwash feed valve 23. The backwash liquid may be water or any other fluid which is compatible with the filter assembly and the feed fluid. Further, the backwash liquid may be treated in various ways, for example, by heating it or shifting its pH.

As the backwash liquid 50 is introduced into the second chamber 13, it may flow through the weep holes 41 and into the interiors of the filter elements 30 to replace any of the filtrate which drained from the interiors of the filter elements 30, through the filter elements 30, and into the first chamber 12. Each weep hole 41 is preferably sufficiently large and the difference in pressure between the first and second chambers 12, 13 is preferably sufficiently small that the backwash liquid fills the interiors of the wetted filter elements 30 and rises within the conduits 40 to about the level of the backwash liquid 50 in the second chamber 13. Once the backwash liquid reaches a suitable level above the weep hole 41, the backwash feed valve 23 is closed.

The filter assembly of the present invention may be equipped with means for automatically determining when the backwash liquid has reached a suitable level, such as a level sensor disposed in the housing 10 or a flow sensor which senses the amount of backwash liquid 50 passing through backwash feed pipe 22. The level of the backwash liquid 50 in the second chamber 13 will depend upon many factors, including the size of the filter element 30 and the amount of backwash liquid 50 which it is desired to flush through the filter elements 30. The second chamber 13 may be completely filled with backwash liquid or, for example, to a level near the second opening 42 in the upper end of the conduit 40. Typically, the level of the backwash liquid is selected so that the volume of the backwash liquid ranges from about 1 to about 10 times the total volume of the interiors of all of the filter elements. The distance between the weep holes 41 and the second opening 42 in the conduit 40 may be selected in accordance with the maximum number of backwashing cycles desired for a particular filter assembly.

In one embodiment of the invention, while the lower drain valve 17 remains open and the first chamber 12 is at atmospheric pressure, the gas feed valve 25 for the gas feed pipe 24 is opened to introduce pressurized gas into the second chamber 13 and increase the gas pressure within the second chamber 13.

The pressurized gas provides the energy for backwashing and any gas which is compatible with the filter assembly, the backwashing liquid, and the feed fluid may be used. Frequently, compressed air or nitrogen is used. The increased pressure is transmitted to the backwash liquid in the conduit 40 and the filter element 30 principally via the second opening 42 in the conduit 40 and preferably as a reverse pressure pulse abruptly forcing the backwash liquid 50 accumulated above and/or in the conduit 40 and in filter element 30 in a reverse direction through the filter element 30 at a high velocity. The force of the outwardly flowing backwash liquid 50 dislodges the particulate or colloidal matter trapped in or on the outer surface of the porous medium of the filter element 30, and the matter is blown out from the filter element 30 together with the backwash liquid 50, as shown by the large solid arrows in FIG. 1. If the filter element 30 is coated with a precoat layer, this, too, is blown off the filter element 30 by the backwash liquid and/or a liquid/gas mixture. The used backwash liquid 50 and the particulate matter may be removed via the lower drain pipe 16, or if the lower drain valve 17 is closed, it may collect on the bottom of the first chamber 12.

Once the backwash liquid 50 accumulated in the conduit 40 and in the filter element 30 has been blown through the filter element 30, the head pressure of the backwash liquid remaining in the second chamber 13 will continue to force a small amount of the backwash liquid 50 through the weep holes 41 and into the interiors of the filter elements 30. A mixture of gas and backwash liquid 50 may then continue to be forced in a reverse direction through the filter elements 30, further cleaning the porous medium and/or stripping the precoat layer from each filter element 30. After a suitable length of time, the pressure differential between the second and first chambers 13, 12 may be eliminated, for example, by closing the gas feed valve 25.

The characteristics of the reverse pressure pulse, e.g., the magnitude of the differential pressure between the second and first chambers 13, 12 and the duration of the pulse, may vary depending on such factors as the ability of the filter element to withstand reverse pressure differentials and the desired reverse flow velocity for cleaning the filter element and/or removing the precoat layer. In the illustrated embodiment, where the first chamber 12 is maintained at atmospheric pressure during the backwash operation, the gas introduced into the second chamber 13 via the pressurized gas feed pipe 24 may be in the range from about 5 to about 200 psi, more preferably about 10 to about 100 psi, and the duration of the pulse may be in the range from about 1 to about 10 seconds, more preferably about 2 to about 5 seconds. The duration of the pulse may be no greater than the amount of time needed to blow the backwash liquid 50 originally accumulated above and/or in conduit 40 and in the filter element 30 through the filter element 30. Preferably, the duration is somewhat longer to allow a mixture of backwash liquid and gas to be blown through the filter element 30 as well.

This backwash operation may be repeated. The backwash liquid 50 remaining in the second chamber 13 drains through the weep holes 41 into the interiors of the filter elements 30. Once the backwash liquid 50 has again filled the interior of each filter element 30, the gas feed valve 25 is opened to abruptly increase the pressure in the second chamber 13 and blow the backwash liquid 50 out of the filter element 30. Cycles of draining the backwash liquid 50 into the interiors of the filter elements 30 and then blowing it out with gas pressure can be repeated as long as backwash liquid 50 remains in the second chamber 13 above the weep holes 41. The initial level of the backwash liquid 50 in the second chamber 13 and the distance from the weep hole 41 to the upper opening in the conduit 40 can be selected in accordance with the number of cycles to be performed.

Upon the completion of backwashing operation if there is any backwash liquid 50 remaining in the second chamber 13, it can be drained via the upper drain pipe 20. The filtering operation may then be resumed, or a new precoat layer may be deposited on the filter elements 30 followed by the filtration operation.

A filter assembly and a backwashing method embodying the present invention are highly effective. The backwashing method decreases the flow resistance of the filter element 30 by removing accumulated particulate and colloidal matter which can foul the porous medium, as a result of which the efficiency of the filter assembly can be increased. Furthermore, the backwashing method removes any spent precoat layer on the filter element 30 so that a fresh precoat layer can be applied to restore the filtration performance of the filter element 30. While the filter assembly and backwash method are very effective, they nonetheless use relatively little backwash liquid. The amount of backwash liquid blown through the filter elements 30 each backwash cycle may be limited to the relatively small amount of backwash liquid accumulated in the interiors of the conduits 40 and the filter elements 30. Thus, filter assemblies and backwash operations embodying the invention are not only effective but also efficient and economical.

The previously described filter assembly and backwashing method may be modified or alternatively embodied in a variety of ways without departing from the scope of the present invention. For example, in an alternative mode of operation of the filter assembly, after the filtration operation is ended and the feed fluid is drained from the first chamber 12, the lower drain valve 17 may be closed. Before or after the backwash liquid is introduced into the second chamber, both the first chamber 12 and the second chamber 13 are pressurized, for example, via the pressurized gas feed pipe 24 and the gas feed valve 25 in the second chamber 13. Preferably, both chambers 12, 13 are may be pressurized to a value in the range of about 10 to about 100 psi. With both chambers 12, 13 pressurized and the backwash liquid accumulated in the interiors of the filter elements 30, the lower drain valve 17 is opened, venting the first chamber 12 directly through the lower drain pipe 16 and venting the second chamber 13 through the lower drain pipe 16 via the conduits 40 and the filter elements 30. This blows the backwash liquid and the gas in the second chamber 13 through the filter elements 30, cleaning each filter element 30 of particulate and colloidal matter and/or the spent precoat. The lower drain valve 17 may then be closed, allowing both chambers 12, 13 to be repressurized and the backwash liquid to refill the filter elements 30 via the weep holes 41. Similar backwashing cycles may be continued as long as there is sufficient backwashing liquid in the second chamber 13 above the weep holes 41.

As an example of another alternative mode of operation, after the filtration operation is ended, the feed fluid may be drained only slightly from the first chamber 12, e.g., by about 10% or less, via the lower drain pipe 16. Preferably, the porous media of the filter elements 30 remain submerged. The lower drain valve 17 is then closed, leaving a bubble below the partition 11. Once the backwash liquid is introduced into the second chamber 13, the gas feed valve 25 is opened while the lower drain valve 17 is closed to rapidly pressurize the second chamber 13. This forces the backwash liquid accumulated in the conduits 40 and the filter elements 30 against the feed fluid surrounding the filter elements 30, compressing the bubble below the partition 11 and cleaning the filter elements 30 of particulate and colloidal matter and/or the spent precoat. The gas feed valve 25 is then closed and the solids matter is allowed to settle to the bottom of the first chamber 12 for immediate or later disposal. The bubble below the partition 11 may then be re-initiated by partial draining or venting, and similar backwashing cycles may be continued as long as there is backwashing liquid in the second chamber 13 above the weep holes 41.

Figure 2:
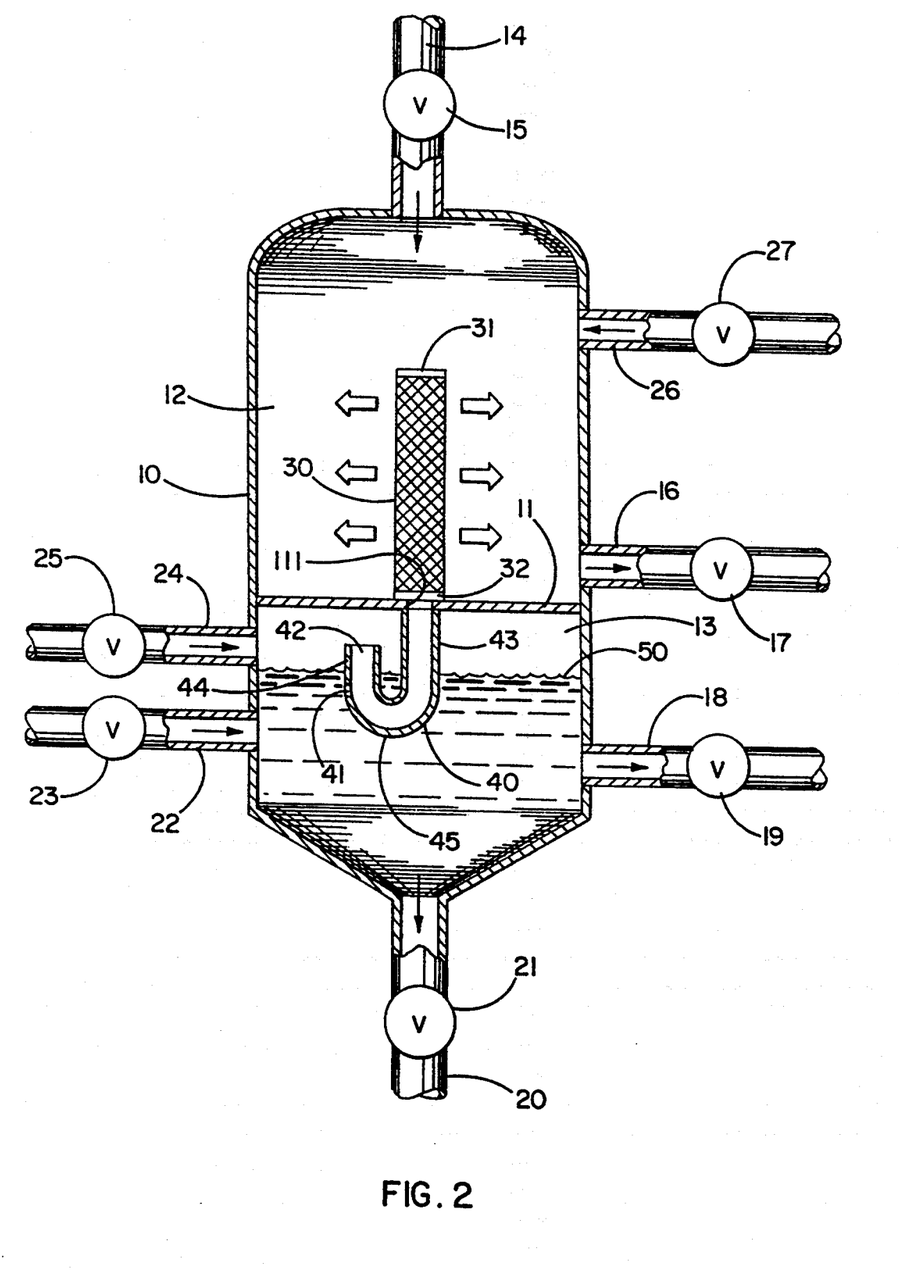
FIG. 2 is a cross-sectional elevation view of a second embodiment of a filter assembly according to the present invention in which a filter element is disposed above rather than below a partition.

An example of a second filter assembly embodying the present invention is shown in FIG. 2. In this embodiment, unlike the embodiment shown in FIG. 1, the partition 11 is positioned in a lower portion of the housing 10 and divides the housing 10 into a first chamber 12 above the partition 11 and a second chamber 13 below the partition 11. Many of the components of the second embodiment of the filter assembly are similar to the components of the first embodiment of the filter assembly and have identical reference numerals. For example, a fluid feed pipe 14 communicates with the first chamber 12 via a fluid feed control valve 15 while a first chamber drain pipe 16 communicates with the first chamber 12 via a drain pipe control valve 17. In addition, a filtrate discharge pipe 18, a second chamber drain pipe 20, a backwash liquid feed pipe 22, and a pressurized gas feed pipe 24 each communicate with the second chamber 13 via an appropriate control valve 19, 21, 23, 25. Preferably, the pressurized gas feed pipe 24 communicates with the second chamber 13 just below the partition 11.

One or more filter elements 30 extend within the first chamber 12 above the partition 11, each communicating with an opening 111 in the partition 11. One or more conduits 40 extend below the partition 11 into the second chamber 13. One end of each conduit 40 has a first opening which communicates with an opening 111 in the partition 11 while the other end has a second opening 42 which opens below the partition 11, preferably near the partition 11. In the second embodiment of the filter assembly shown in FIG. 2, the conduit 40 includes a first conduit portion 43, a second conduit portion 44, and a bight 45 which connects the first and second conduit portions 43, 44. The first conduit portion 43 includes the first opening of the conduit 40 and communicates with the opening 111 in the partition. The second conduit portion 44 includes the second opening 42 of the conduit 40 and communicates with the second chamber 13. The bight 45 forms a low portion of the conduit 40 spaced from the second opening 42 of the conduit 40, e.g., intermediate the first and second openings of the conduit 40. In accordance with the invention, one or more weep holes 41 are disposed in the conduit 40, preferably above the bight 45 and below the second opening 42 of the conduit 40.

In an alternative embodiment of the conduit 40, shown in FIG. 3, one end of the conduit again has a first opening which communicates with an opening 111 in the partition 11 while the other end has a second opening 42 which opens below the partition 11, preferably near the partition 11. The conduit 40 also includes a first conduit portion 43 and a second conduit portion 44. The first conduit portion 43 includes the first opening of the conduit 40 and communicates with the opening 111 in the partition 11. The first conduit portion 43 also has a third opening 46 which opens into the second conduit portion 44. The third opening 46 of the first conduit portion 43 forms a low portion of the conduit 40 spaced from the second opening 42 of the conduit 40, e.g., intermediate the first and second openings of the conduit 40. The second conduit portion 44 is closed at the bottom but includes the second opening 42 of the conduit 40 at the top, preferably near the partition 11. In accordance with the invention, one or more weep holes 41 are disposed in the second conduit portion 44, preferably above the third opening 46 of the first conduit portion 43 but below the second opening 42 of the conduit 40.

Figure 3:
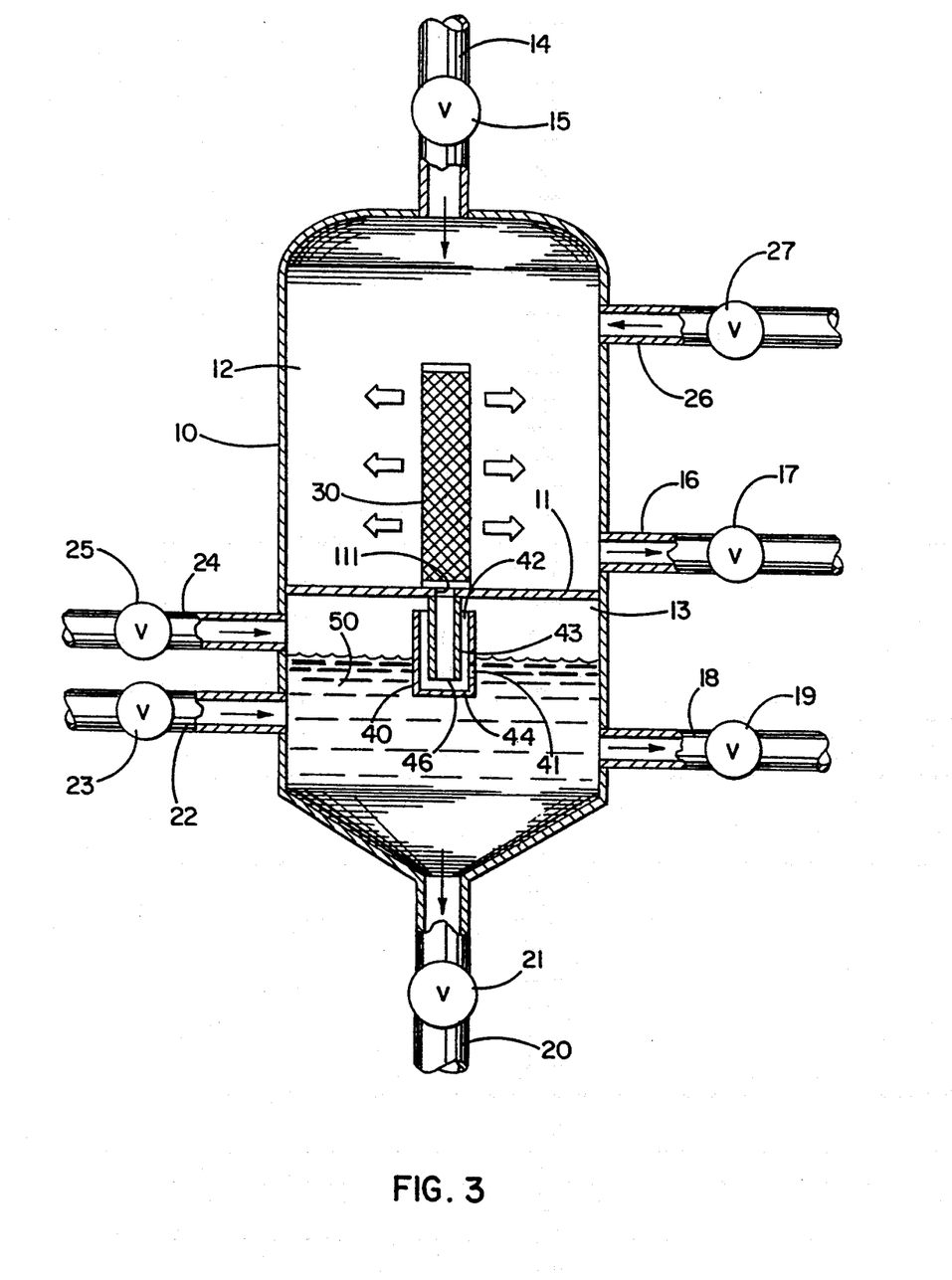
FIG. 3 is a cross-sectional elevation view of a modification of the second embodiment shown in FIG. 2.

The modes of operation of the second embodiment of the filter assembly, as shown in FIGS. 2 and 3, are very similar to the modes of operation of the first embodiment of the filter assembly, as shown in FIG. 1. For example, a precoat layer may be deposited on each of the filter elements 30 or the feed fluid may be filtered in a precoat operation or a filtration operation similar to those described with respect to the first embodiment of the filter assembly.

The backwashing operations for the second embodiment of the filter assembly are also similar to the backwashing operations described with respect to first embodiment of the filter assembly. For example, to backwash the filter assembly shown in FIG. 2, the first chamber drain valve 17 may be opened and the feed fluid may be drained from the first chamber 12 via the drain pipe 16. The second chamber 13 may remain full of filtrate, or the second chamber drain valve 21 may be opened to partially drain filtrate from the second chamber 13 via the drain pipe 20 and then closed to leave a sufficient amount of the filtrate in the second chamber to serve as the backwash liquid. Alternatively, the filtrate may be completely drained from the second chamber 13 and, once the second chamber drain valve 21 is closed, the backwash liquid 50 may be added to the second chamber 13 via the backwash liquid feed pipe 22 and control valve 23. The amount of backwash liquid initially contained within the second chamber 13 may vary, depending on the number of backwash cycles desired. For example, the second chamber 13 may be completely filled, or the level of the backwash liquid initially contained in the second chamber 13 may be between the weep hole 41 and the second opening 42 of the conduit 40, the distance between the weep holes 41 and the second opening 42 of the conduit 40 corresponding to the maximum number of backwash cycles which may be desired. The backwash liquid contained within the second chamber 13 drains through the weep holes 41 and into the conduits 40, establishing a level within the conduits 40 which corresponds to the level of the backwash liquid in the second chamber 13.

While the first chamber drain valve 17 remains open and the first chamber 12 is at atmospheric pressure, the gas feed valve 25 for the gas feed pipe 24 is opened to introduce pressurized gas into the second chamber 13 and increase the gas pressure within the second chamber 13. This abruptly forces the backwash liquid 50 accumulated in each conduit 40 upward into the interior of the filter element 30 and then blows the backwash liquid through the filter element 30 in a reverse direction at a high velocity, cleaning filter elements 30 and/or stripping the precoat layer as previously described with respect to the first embodiment of the filter assembly shown in FIG. 1.

Once the backwash liquid accumulated in the conduits 40 of the filter assembly has been blown through the filter elements 30, the head pressure of the backwash liquid remaining in the second chamber 13 will continue to force a small amount of backwash liquid through the weep holes 41 and into the interiors of the conduits 40. A mixture of gas and backwash liquid may then continue to be forced upwards into the interior of the filter elements 30 and then in a reverse direction through the filter elements 30, further cleaning the porous medium and/or stripping the precoat layer from each filter element 30. After a suitable length of time, the pressure differential between the first and second chambers 13, 12 may be eliminated, for example by closing the gas feed valve 25. Cycles of draining the backwash liquid into the interiors of the conduits 40 and then blowing it out with gas pressure can be repeated as long as a backwash liquid remains in the second chamber 13 above the weep holes 41.

This backwashing operation is subject to many modifications and alternative embodiments, for example, as previously discussed with respect to the first embodiment of the filter assembly, and backwashing methods embodying the present invention are effective, efficient, economical ways to clean the second embodiment of the filter assembly.

Although the present invention has been described in terms of exemplary embodiments and modifications, it is not limited to these embodiments and modifications. Alternative embodiments, modifications, and equivalents, which would still be encompassed by the invention, may be made by those skilled in the art, particularly in light of the foregoing teachings. Therefore, the following claims are intended to cover any alternative embodiments, modifications, or equivalents which may be included within the spirit and scope of the invention as defined by the claims.

What is claimed is:

1. A filter assembly comprising:
    a housing divided into a first chamber and a second chamber, the second chamber being arranged to contain a backwash liquid;
    a filter element disposed in the first chamber and having an interior;
    a conduit disposed in the second chamber and having an interior which communicates with the interior of the filter element and an opening which communicates with the second chamber;
    a weep hole arranged to drain backwash liquid from the second chamber into the filter element or the conduit, the weep hole being below the opening in the conduit; and
    a gas feed pipe arranged to introduce pressurized gas into the second chamber to force the backwash liquid through the conduit and into the filter element.

2. An assembly as claimed in claim 1 wherein the first chamber is disposed below the second chamber.

3. An assembly as claimed in claim 2 wherein the conduit extends substantially vertically.

4. An assembly as claimed in claim 3 wherein the weep hole is formed in the conduit.

5. An assembly as claimed in claim 1 wherein the first chamber is disposed above the second chamber.

6. An assembly as claimed in claim 5 wherein the conduit has a portion for accumulation of backwash liquid disposed below the opening in the conduit.

7. An assembly as claimed in claim 6 wherein the weep hole is formed in the conduit.

8. An assembly as claimed in claim 1 wherein the housing includes a partition separating the first and second chambers and having an opening communicating between the first and second chambers and wherein the conduit extends from the opening on one side of the partition.

9. An assembly as claimed in claim 8 wherein the filter element extends from the opening on the other side of the partition.

10. An assembly as claimed in claim 9 wherein the filter element is sealed to the partition.

11. An assembly as claimed in claim 8 wherein the conduit surrounds the opening in the partition.

12. An assembly as claimed in claim 8 wherein the partition is sealed to the interior of the housing.

13. An apparatus as claimed in claim 1 wherein the filter element comprises a precoat filter element.

14. An assembly as claimed in claim 1 wherein the conduit has a bight for accumulation of backwash liquid formed therein.

15. An assembly as claimed in claim 1 wherein the conduit comprises a hollow inner portion having an interior communicating with the filter element and a hollow outer portion surrounding the inner portion and defining a space for accumulation of backwash liquid between the inner and outer portions, and wherein the weep hole is formed in the outer portion.

16. An assembly as claimed in claim 15 wherein the inner portion has an opening communicating with the space between the inner and outer portions, and the weep hole is disposed above the opening in the inner portion.

17. An assembly as claimed in claim 1 wherein the conduit comprises a tube and the opening in the conduit comprises an open end of the tube.

18. An assembly as claimed in claim 1 including a plurality of filter elements disposed in the first chamber and a plurality of conduits disposed in the second chamber, each conduit corresponding to one of the filter elements and communicating with the interior of the corresponding filter element, each conduit having an opening communicating with the second chamber and a weep hole below the opening.

19. An assembly as claimed in claim 1 wherein the gas feed pipe communicates with the inside of the second chamber above the weep hole.

20. An assembly as claimed in claim 1 wherein the first chamber is disposed above the second chamber, the housing includes a partition separating the first and second chambers and having an opening communicating between the first and second chambers, the conduit extends from the opening on one side of the partition, the filter element extends from the opening on the other side of the partition, and the weep hole is formed in the conduit.

21. An assembly as claimed in claimed in claim 20 wherein the opening in the conduit is disposed beneath the partition, and the conduit includes a bight for accumulation of backwash liquid disposed interconnecting the opening in the conduit and the partition.

22. An assembly as claimed in claim 20 wherein the conduit comprises a hollow inner portion having a first end connected to the partition and a second end, and a hollow outer portion surrounding the inner portion, the weep hole being formed in the outer portion above the second end of the inner portion.

23. An assembly as claimed in claim 22 wherein the outer portion has a closed bottom.

24. An assembly as claimed in claim 1 wherein the first chamber is disposed below the second chamber, the housing includes a partition separating the first and second chambers and having an opening communicating between the first and second chambers, the conduit extends from the opening on one side of the partition, the filter element extends from the opening on the other side of the partition, and the weep hole is formed in the conduit.

25. A filter assembly comprising:
a housing including a partition dividing the housing into a first chamber and a second chamber, the partition including an opening communicating between the first and second chambers;
a filter element extending from the opening in the partition into the first chamber and having an interior;
a conduit extending from the opening in the partition into the second chamber and including an interior communicating with the interior of the filter element, an opening communicating with the second chamber, and a weep hole below the opening in the conduit; and
a gas feed pipe coupled to the housing to introduce pressurized gas into at least one of the first and second chambers and force backwash liquid through the conduit and into the filter element.

* * * * *